March 4, 1924.
L. J. R. HOLST
1,485,929
LENS
Filed May 23, 1919
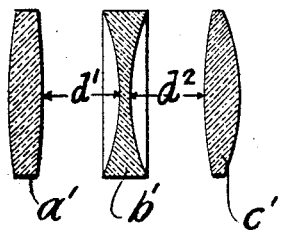
WITNESS:
INVENTOR.
BY
ATTORNEY.

Patented Mar. 4, 1924.

1,485,929

UNITED STATES PATENT OFFICE.

LODEWYK J. R. HOLST, OF PHILADELPHIA, PENNSYLVANIA, ASSIGNOR TO ARTHUR BROCK, JR., OF PHILADELPHIA, PENNSYLVANIA.

LENS.

Application filed May 28, 1919. Serial No. 300,395.

*To all whom it may concern:*

Be it known that I, LODEWYK J. R. HOLST, a citizen of the United States of America, residing in the city and county of Philadelphia and State of Pennsylvania, have invented a certain new and useful Improvement in Lenses, of which the following is a true and exact description, reference being had to the accompanying drawings, which form a part thereof.

The leading object of my invention is to provide means for the complete correction of the chromatic aberration in objectives for photography, astronomy, telescopes and other uses, although, as will be explained, my new lens has other valuable characteristics.

The means thus far used to achieve chromatic correction permit to equalize the foci of as many different colors as the number of different kinds of glass of which the objective is constructed. This number rarely exceeds three, on account of the extraordinary complications in computation which arise when more kinds are combined to one objective. Furthermore, the combination of glasses in which the spectra show approximation to proportional dispersion tends to reduce the so called secondary chromatic aberration, but as no two different glass materials exist in which the dispersions are really proportional, this only leads to a reduction of the secondary chromatic errors but never to their complete elimination.

Therefore, if an objective be constructed of elements made from the same kind of glass and coincidence of focal length for two colors, say for instance, those corresponding to the $d$ line and to the $g$ line of the spectrum is obtained, all other colors will also unite in the same focal point since in that case the spectrums are completely alike.

It is well known that color-correction can be obtained when combining two elements of the same material, by suitably spacing them apart, but such systems suffer from the limitation that their color-correction is good only for one given distance of the source of the light they receive.

I have found that by combining three or more elements of the same kind of glass together, at least one of which elements possesses a focal length of opposite sign to that of the others, and by suitably spacing such elements it is possible to obtain complete chromatic correction for all distances of the source of light located either in the axis or eccentrically.

The nature of my invention will be best understood as explained in connection with the drawings which show diagrammatically a lens embodying my invention in which $a'$ and $c'$ are the outer elements and $b'$ the inner elements.

To explain my lens and its proper construction and mode of operation in greater detail:

If a block of glass with two flat and parallel outer surfaces is built up of three components the middle element being in the form of a double concave lens and the outer elements being respectively in the form of a plano-convex and a convexo-plane lens and the curved surfaces are of such radii that the power of the last element considered as a unit is 1, the power of the middle element is $-1{,}71482$ and the power of the front element is $+.71482$. The sum of the powers of the outer elements will be $+1.71482$ and that of the middle element is $-1.71482$, so that their combination has 0 power or no focus when in contact. As all the glass is of the same kind, the block will optically behave as a piece of plane parallel glass without focus and without color dispersion. The drawing shows elements $a'$, $b'$ and $c'$ having respectively the same power as stated but curved so as to give the best attainable corrections in every respect. These variations in form have no influence on the chromatic correction, which is dependent solely on the relative power of the three elements and distances between $a'$ and $b'$ and between $b'$ and $c'$ respectively.

The word power as used in the further description means the reciprocal of the focal length of an element or of a combination of elements.

Since the stigmatic correction is also dependent on the power of the elements which will hereafter be indicated by $\varphi_1$ for element $a$, $\varphi_2$ for element $b'$ and $\varphi_3$ for element $c'$ this transposition has not affected the stigmatism. The so-called Petzvall condition for the elimination of stigmatism requires that:

$$\frac{\varphi_1}{n_1}+\frac{\varphi_2}{n_2}+\frac{\varphi_3}{n_3}=0$$

$n_1$, $n_2$ and $n_3$ being the indexes of refraction, and since in the case here described $n_1=n_2=n_3$ this becomes $$\varphi_1+\varphi_2+\varphi_3=0$$

which condition is thus fully complied with as already shown.

The expressions uniting the powers of the various elements with their distances, as developed from the laws of refraction and dispersion to secure compliance with the two chromatic conditions, viz: the equality of the focal length for the corrected colors and the coincidence of the focal points for the same colors, are respectively:

$$\varphi_2^2-\varphi_2\left[1+\left(\frac{1}{d_1}+\frac{1}{d_2}\right)\left(1-\frac{1}{w}\right)\right]=\frac{1}{w}-\frac{1}{d_1}-\frac{1}{d_2}$$

and $\varphi_1 d_1 = \varphi_3 d_2 (1-d_2)$ in which $\varphi_1$, $\varphi_2$ and $\varphi_3$ have the meanings already explained, $d_1$ and $d_2$ are respectively the distance between $a'$ and $b'$ and between $b'$ and $c'$, and $w$ is the proportion between the mean dispersions of the sorts of glass used for element $b'$ and element $a'$, so that in the present instance $w=1$. This reduces the equation for $\varphi_2$ to $$\varphi_2^2-\varphi_2=1-\frac{1}{d_1}-\frac{1}{d_2}$$

which gives on development $$d_1=\frac{d_2}{\varphi_2^2 d_2+\varphi_2 d_2-d_2+1}$$

From the equation for $\varphi_1$ we get $$d_1=\frac{\varphi_3 d_2(1-d_2)}{\varphi_1}$$

and since $f_3$ has been selected as unity $$\frac{\varphi_3}{\varphi_1}=\frac{f_1}{f_3}=f_1, \text{ hence } d_1=f_1 d_2(1-d_2)$$

By finally equating both expressions for $d$ we find $$d_2=-(\varphi_2^2+\varphi_2-2)\pm\frac{\sqrt{4(\varphi_1^{-1})+(\varphi_2^2+\varphi_2^{-2})}}{2(1-\varphi_2^2-\varphi_2)}$$

which thus establishes $d_2$ in functions of the powers of $\varphi^2$ and $\varphi'$ with $\varphi_3$ as unit of measure.

For a numerical example let:

$\varphi_1 = .71482 \quad f_1 = 1.4$
$\varphi_2 = 1.71482 \quad f_2 = .58333$
$\varphi_3 = 1.000 \quad f_3 = 1.000$ Then $d_2$ in accordance with the above expression is $=.251972$ and $d_1 = f_1 d_2 (1-d_2) = 1.4 \times .251972 \times .748028 = .263874$, and the resulting equivalent focus of the combination will be $$F=\frac{f_1 \times f_2 \times f_3}{f_2(f_1-d_1)+(f_3-d_2)(f_1+f_2-d_1)}=\frac{-.816972}{-.2492345}=3.277.$$

With a view to securing the most favorable results in the correction of the axial and oblique spherical aberration and coma, it is desirable to use glass of a high index with a low dispersion, although it is not a necessary condition for the compliance with the chromatic corrections, for which latter purpose by itself glass of any nature may be selected. Since high refraction results, however, in flattening of the curves, and low dispersion tends to hold down to a minimum the unavoidable variation of the measured dispersion with the actual dispersion, the selection of glasses of the Barium Crown group is advantageous, but, as stated, by no means necessary for the carrying into effect of this invention.

From the numerical example given it will be seen that a judicious selection of $\varphi_1$ and $\varphi_2$ leads to the construction of very compact objectives, the sum of the two distances $d_1$ and $d_2$ being only the $\frac{1}{6.3}$ part of the focal length, as given in the example. It will furthermore be seen that the relatively weak power of the elements leads to low cost of production since only shallow curves are required. This permits to grind and polish a considerable number of lenses at a time. Furthermore, since only one kind of glass is used, it is possible to use any good white glass and satisfactory objectives of moderate relative openings could be made in accordance with this invention from good quality plate glass.

As the method to be pursued for the determination of the radii of curvature of the various elements differs in no wise from the method used when the elements are composed of different kinds of material and do not form a part of this invention no further attention is given them here.

Having now described my invention, what I claim as new and desire to secure by Letters Patent, is:

1. A composite lens composed of not less than three separated elements all made from the same material, said separations being regulated relatively to the powers of said elements so as to cause the combined action thereof to substantially eliminate chromatic differences throughout the entire range of the spectrum passed by the material of said elements.

2. A composite lens composed of not less than three separated elements all made from the same material, said separations being regulated relatively to the powers of said elements so as to cause the combined action thereof to substantially eliminate chromatic differences throughout the entire range of the spectrum passed by the material of said elements, and the powers of the separate elements of the lens aggregating zero to eliminate stigmatic aberrations.

3. A composite lens composed of not less than three separated elements all made from the same material, and each of low power to minimize spherical aberrations, said separations being regulated relatively to the powers of said element so as to cause the combined action thereof to substantially eliminate chromatic differences throughout the entire range of the spectrum passed by the material of said elements.

LODEWYK J. R. HOLST.